No. 794,285. PATENTED JULY 11, 1905.
W. EPPINGER.
PROCESS OF CURING MEAT PRODUCTS.
APPLICATION FILED SEPT. 22, 1904.
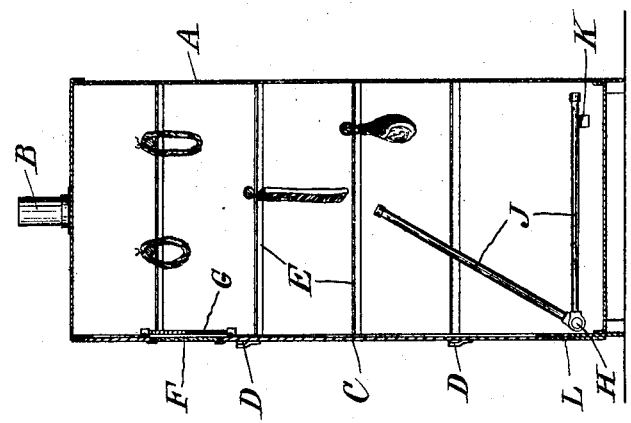
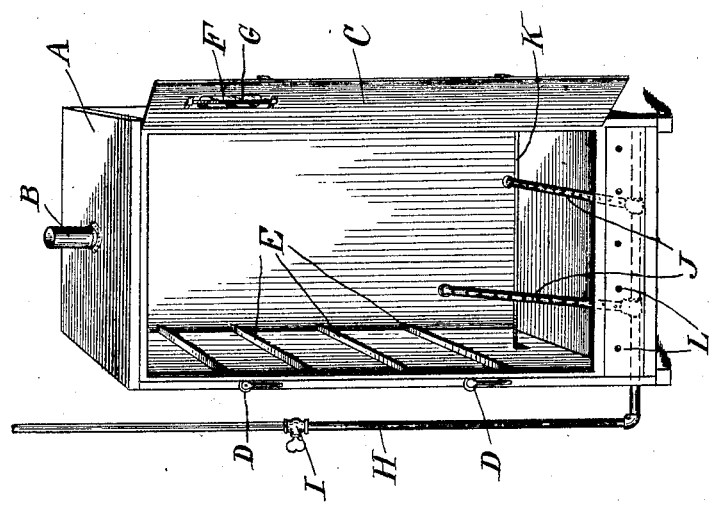
Witnesses
M. E. Regan.
A. M. Goddard
Inventor
W. EPPINGER
By his Attorneys
Southgate & Southgate No. 794,285. Patented July 11, 1905.

UNITED STATES PATENT OFFICE.

WILLIAM EPPINGER, OF NEW YORK, N. Y., ASSIGNOR TO MAX BRAND, OF NEW YORK, N. Y.

PROCESS OF CURING MEAT PRODUCTS.

SPECIFICATION forming part of Letters Patent No. 794,285, dated July 11, 1905.

Application filed September 22, 1904. Serial No. 225,397.

*To all whom it may concern:*

Be it known that I, WILLIAM EPPINGER, a citizen of the United States, residing at New York, in the county of New York and State of New York, have invented a new and useful Process of Curing Meat Products, of which the following is a specification.

The ordinary process of smoking or curing meat products—such as sausages, hams, &c.—consists in building a wood-fire, usually out of hickory or oak chips and shavings, in a compartment or smoke-house, and after such fire has reached a smoldering condition in placing the meat products in such compartment for a sufficient time to allow them to be slightly cooked and smoked to acquire the flavor of the smoldering wood-fire. This has been found to be a slow, expensive, and irregular process, because it takes considerable time to bring the fire to the right condition, because the heat of the smoldering fire is not very great, and because different fires will necessarily be different in cooking and smoking properties. I have discovered that meat products can be cured and smoked in a much more satisfactory and expeditious way by subjecting them in a closed compartment or smoke-house to the heat and products of combustion of ordinary illuminating-gas burned in the ordinary way unmixed with air until it issues from the jets, as in the ordinary illuminating-burners, which give a yellow or illuminating flame, or with an unsatisfied combustion, as distinguished from the Bunsen burners, in which air is mixed with the gas before combustion, giving a colorless or complete combustion. By treating the meat products in this way the same are cooked and an appetizing smoky flavor is imparted to the same. Moreover, as gas-flames are easily regulable the cooking and curing processes can be much more accurately performed than over a smoldering wood-fire. In some instances, where the wood-flavor is particularly desired, the meat products are subjected for a small part of the last part of the process to the action of such fumes.

The accompanying drawings show an improved form of apparatus by which the foregoing method can be carried out.

Referring to said drawings, Figure 1 is a front elevation of the apparatus, and Fig. 2 is a cross-sectional view thereof.

In detail, A designates a box or compartment, leading from which is a small outlet or escape pipe B. The box has a hinged door C, which can be tightly closed by locks D. Arranged in the box are ribs or projections E, on which may be placed poles or bars, to which the meat products are hung or on which may be slid perforated trays carrying the meat products. The door C has an opening F, which is filled with glass, and inside of the door is arranged a thermometer G, by which the temperature inside of the box can be watched. A gas-pipe H, having a suitable valve or cock I, extends into and across the front lower portion of the box. Pivoted on the same and connected therewith are suitable branch arms J J, which are perforated or which have suitable nipples or burners projecting therefrom. K designates a suitable support for the ends of these branches. Small draft-holes L are arranged on the front lower portion of the box.

The process is carried out as follows: The meat products are placed in position in the compartment, the pivoted branch pipes J are raised, the gas turned on in the pipe H, and the issuing jets from the pipes J are ignited. This will give a series of the ordinary yellow flames. The pipes J are then lowered to horizontal position, the door closed, and the valve I operated to get the proper temperature inside of the compartment. The heat from the flames and the products of combustion thereof will cook and smoke the meats. The draft-holes L being small, the combustion will be in some measure an unsatisfied one, which will give a smoky flavor to the meat products. At the completion of the process the door is opened and a few shovelfuls of sawdust or chips thrown in on top of the gas-pipes to impart a smoky-wood flavor to the products. After the charge has been sufficiently cooked and smoked the gas is turned off and the small fire, if one is used, is allowed to go out, so that when the door is opened to withdraw the cured-meat products there will be very little escaping smoke or fumes.

A serious objection to the ordinary smokehouse using a wood fire entirely is that it is necessary to open the door before the fire is out, allowing the fumes to escape, which often causes complaint to be made in the neighborhood and action to be taken by the authorities.

The pivoted construction of the branch gas-pipes allows the same to be lifted up through the ashes and sawdust from the wood, when they are to be reignited for the next charge.

Other forms of apparatus may be devised for carrying out the process covered by the claims.

I have been unable to ascertain with scientific certainty the exact chemistry of my process; but many practical demonstrations of its effectiveness in quickly and thoroughly curing the various meat products usually preserved by the ordinary time-consuming and uncertain smoke process convinces me that the result must be due to the combined effect of the heat of the burning gas and the smoke and vaporous products generated by the same. In practice I have found a temperature of about 200° Fahrenheit to be most effective; but the temperature can be varied to a considerable degree without interfering with the process, although at all times a sufficiently high temperature must be maintained to slightly cook the meat.

Having thus fully described my invention, what I claim, and desire to secure by Letters Patent of the United States, is—

1. The process of curing and smoking meats, consisting in subjecting the same to the action of the heat, smoke and vapors generated by burning a regulable supply of illuminating-gas in a chamber closed except for the provision of an air-supply restricted sufficiently to supply only the necessary oxygen to maintain unsatisfied combustion of the gas, the temperature of the chamber being maintained by the burning gas at a degree sufficient to slightly cook the meat.

2. The process of curing and smoking meats, consisting in subjecting the same to the action of the heat, smoke and vapors generated by burning a regulable supply of illuminating-gas in a chamber closed except for the provision of an air-supply restricted sufficiently to supply only the necessary oxygen to maintain unsatisfied combustion of the gas, the temperature of the chamber being maintained by the burning gas at a degree sufficient to slightly cook the meat, and finally subjecting the meat while in said chamber to the action of the vaporous products of burning wood to impart to the meat a wood-smoke flavor.

In testimony whereof I have hereunto set my hand in the presence of two subscribing witnesses.

WILLIAM EPPINGER.

Witnesses:
   Louis W. Southgate,
   Max Brand.